Jan. 3, 1933.  A. E. ANDERSON  1,893,348
CIRCUIT BREAKER CONTROL SYSTEM
Filed July 22, 1931
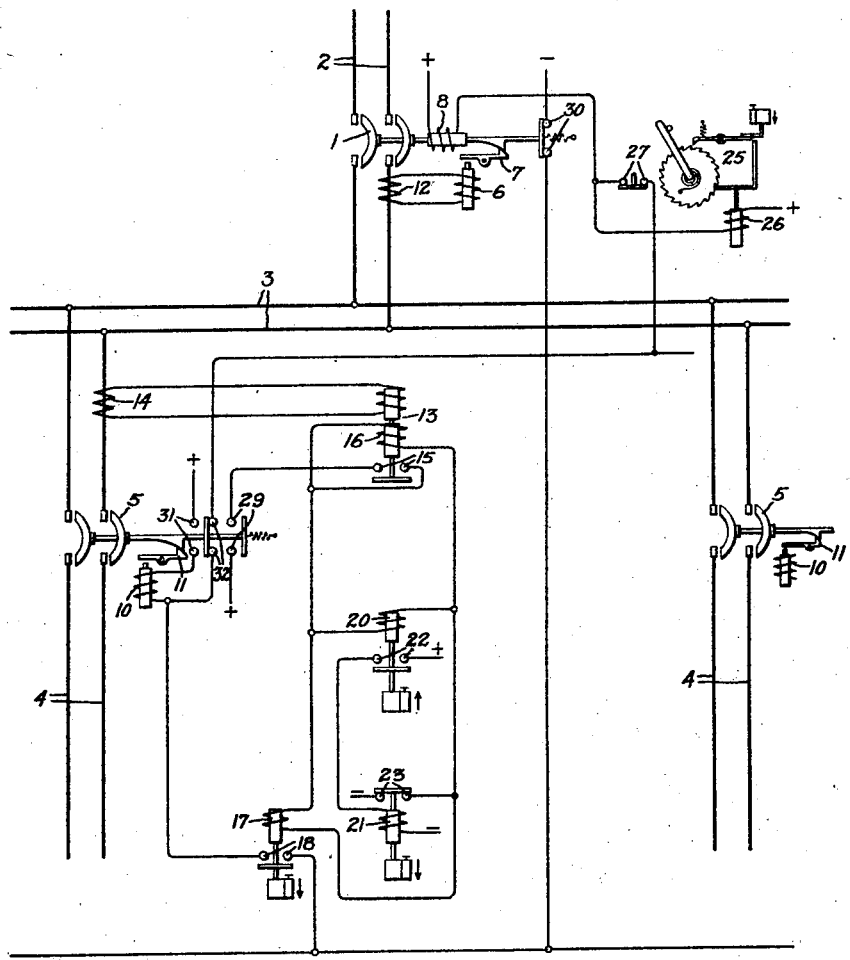
Inventor:
Arvid E. Anderson,
by Charles E. Tullar
His Attorney.

Patented Jan. 3, 1933

1,893,348

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

CIRCUIT BREAKER CONTROL SYSTEM

Application filed July 22, 1931. Serial No. 552,448.

My invention relates to circuit breaker control systems and particularly to systems for controlling the operation of a circuit breaker which connects a supply circuit to a load circuit and the operation of circuit breakers which respectively connect load circuits to the load bus so that when a fault occurs on any load circuit, the circuit breaker in the supply circuit is opened first, then the circuit breaker in the faulty circuit is opened and then the circuit breaker in the supply circuit is reclosed, and one object of my invention is to provide an improved arrangement for accomplishing this result.

My invention will be better understood from the following description when taken in connection with the accompanying drawing which diagrammatically illustrates a circuit breaker control system embodying my invention and its scope will be pointed out in the appended claims.

Referring to the accompanying drawing, 1 represents a circuit breaker which is arranged to connect a supply circuit 2 to a load bus 3. A plurality of load circuits 4 are respectively arranged to be connected to the load bus 3 by circuit breakers 5. The circuit breakers 1 and 5 may be of any suitable type, examples of which are well known in the art. As shown in the drawing, the circuit breaker 1 is of the latched-in type and is provided with a trip coil 6 which, when sufficiently energized, releases a latch 7 so that the circuit breaker opens, and with a closing coil 8 which, when energized, closes the circuit breaker. The circuit breakers 5 are also shown as latched-in circuit breakers and are respectively provided with trip coils 10 which, when sufficiently energized, release the latches 11 which hold the circuit breakers in their closed position. In the particular embodiment of my invention shown in the drawing, it is assumed that the circuit breakers 5 are manually closed but it will be obvious that any suitable closing means, examples of which are well known in the art, may be provided for closing the circuit breakers. Also in order to simplify the disclosure, only the control apparatus for automatically opening one of the circuit breakers 5 is shown since the control apparatus of all of the circuit breakers 5 may be the same.

In order to effect the opening of the circuit breaker 1 in response to a predetermined abnormal condition, such as fault, on a load circuit 4, the trip coil 6 of the circuit breaker 1 is connected by means of a current transformer 12 to the supply circuit 2 so that the trip coil 6 is energized in accordance with the amount of current supplied to all of the load circuits 4 by the supply circuit. The trip coil 6 is arranged so that a predetermined fault on any load circuit causes the trip coil 6 to be sufficiently energized to release the latch 7 and allow the circuit breaker 1 to open.

Each load circuit 4 has associated therewith suitable means for effecting the disconnection thereof from the bus 3 in response to predetermined abnormal conditions on the respective load circuit, as shown, each circuit 4 has associated therewith an overload relay 13, the operating coil of which is connected by means of a current transformer 14 to the associated load circuit 4 in such a manner that the operating coil of the overload relay is energized in accordance with the current in the load circuit. Each overload relay 13 is arranged so that it closes its contacts 15 when the current in the associated load circuit 4 exceeds a predetermined amount. Each overload relay 13 is also preferably arranged in any suitable manner, examples of which are well known in the art, so that after the contacts 15 of the relay are closed, they remain closed independently of the energization of the operating coil of the relay. As shown in the drawing, this result is accomplished by means of a holding coil 16 which is arranged to be energized when the relay contacts 15 and the associated circuit breaker 5 are both closed. Each overload relay 13 has associated therewith an auxiliary relay 17 which is energized when both the contacts 15 of the overload relay 13 and the associated circuit breaker 5 are closed. Each auxiliary relay 17 is designed in any suitable manner so that its contacts 18 are closed as soon as the relay is energized and remain closed for a predetermined time after the relay is deenergized. Each auxiliary relay 17 controls the circuit of the trip coil 10 of the associated circuit breaker 5 and the closing coil 8 of the circuit breaker 1 so that when the circuit breaker 1 opens while the contacts 18 of auxiliary relay 17 are closed, the circuit breaker 5 associated with the closed contacts 18 is opened and then the circuit breaker 1 is reclosed. In this manner, the circuit breakers are selectively controlled so that when a predetermined fault occurs on any load circuit 4, the group circuit breaker 1 is first opened to disconnect the supply circuit 2 from the load bus 3, then the circuit breaker 5 in the faulty load circuit is opened and then the group feeder circuit breaker 1 is reclosed to reconnect the supply circuit 2 to the load bus 3 and the load circuits 4 which are still connected thereto.

With the arrangement shown in the drawing, it is necessary to arrange the operating values of trip coil 6 of the circuit breaker 1 and that of relay 13 associated with circuit breakers 5 so that the amount of current in the load circuit 4 necessary to effect the operation of the overload relay 13 associated therewith is materially less than the amount of current in the supply circuit 2 necessary to effect the opening of the circuit breaker 1. With such an arrangement there is a possibility that certain abnormal conditions on a load circuit may effect the operation of the associated overload relay 13 without causing sufficient current to flow through the supply circuit 2 to effect the opening of the circuit breaker 1. In accordance with one object of my invention, I provide an arrangement whereby under such conditions the operated overload relay 13 in the load circuit and its auxiliary relay 17 are restored to their normal positions if the circuit breaker 1 is not opened within a predetermined time after the overload relay 13 closes its contacts 15. In the particular embodiment of my invention shown in the drawing, this result is accomplished by means of two relays 20 and 21. The relay 20 is arranged so that it is energized when the contacts 15 of the overload relay 13 are closed and the associated circuit breaker 5 is closed. The relay 20 is arranged to close its contacts 22 after the winding of the relay has been energized a predetermined time. The closing of the contacts 22 completes an energizing circuit for the relay 21 which controls contacts 23 in the circuit of the holding winding 16 of the associated overload relay 13. The relay 21 is designed so that it opens its contacts 23 immediately after the winding of the relay is energized but preferably maintains these contacts open for a short time after the relay winding is deenergized. By opening its contacts 23, the relay 21 effects the opening of the contacts 15 of the associated overload relay 13 and the deenergization of the associated auxiliary relay 17.

In order to limit the number of times the circuit breaker 1 may be reclosed, I also provide suitable means, examples of which are well known in the art, for opening the energizing circuit of the closing coil 8 in case it is energized a predetermined number of times within a predetermined time interval. As shown in the drawing, this result is accomplished by means of a well known type of notching relay 25 which has an operating coil connected in parallel with the closing coil 8 and which is arranged to open its manually closed contacts 27 in the circuit of the closing coil 8 in case the operating coil 26 is energized a predetermined number of times with less than a predetermined time interval between each deenergization of the operating winding 26 and the next energization thereof.

The operation of the arrangement shown in the drawing is as follows:

Let it be assumed that while the circuit breakers 1 and 5 are closed, a fault occurs on one of the load circuits 4 so that sufficient current flows from the supply circuit 2 to the load bus 3 to cause the trip coil 6 to effect the opening of the circuit breaker 1, with the added result that sufficient current flows through the faulty load circuit to effect the closing of the contacts 15 of the overload relay 13 associated therewith. The closing of the contacts 15 completes through the auxiliary contacts 29 of the associated circuit breaker 5 and the contacts 23 of the relay 21 energizing circuits for the holding coil 16 of the overload relay 13, the operating winding of the auxiliary relay 17 and the operating winding of the relay 20. Auxiliary relay 17 closes its contacts 18 so that as soon as the circuit breaker 1 opens, a circuit is completed for the trip coil 10 of the circuit breaker 5 in the faulty load circuit. This circuit includes the auxiliary contacts 30 of the open circuit breaker 1, the contacts 18 of the relay 17, trip coil 10 and the contacts 31 of the closed circuit breaker 5. When the circuit breaker 5 in the faulty load circuit opens, the circuits of the holding coil 16 and the relays 17 and 20 associated therewith are interrupted by the opening of the auxiliary contacts 29 of the circuit breaker. Before the relay 17 opens its contacts 18, however, circuits are completed through these contacts for the closing coil 8 of the circuit breaker 1 and the operating winding 26 of the notching relay 25. These circuits also include the auxiliary contacts 30 of the open circuit breaker 1, contacts 18 of the relay 17, the auxiliary contacts 32 of the open circuit breaker 5 and the contacts 27 of the notching relay 25. When the circuit breaker 1 closes, the circuits of the closing coil 8 and the operating winding 26 of the notching relay 25 are interrupted by the opening of the auxiliary contacts 30 on the circuit breaker 1.

If a plurality of faults occur within a predetermined time or some other abnormal condition occurs so that the operating winding 26 of the notching relay 25 is energized a predetermined number of times with less than a predetermined time interval between each deenergization and the subsequent energization thereof, the notching relay opens its contacts 27 in the circuits of the closing coil 8 of the circuit breaker 1 and the operating winding 26 of the relay 25. Since the closing of contacts 27 is preferably manually controlled, it will be seen that the circuit breaker 1 cannot be reclosed again until the contacts 27 have been reset manually.

Let it be assumed now that a fault occurs on one of the load circuits 4 which causes the overload relay 13 associated therewith to close its contacts 15 but does not cause the trip coil 6 in the supply circuit to effect the opening of the circuit breaker 1. The closing of the contacts 15 of the overload relay 13 effects, in the manner above described, the energization of the associated auxiliary relay 17 and time relay 20. If the circuit breaker 1 does not open within a predetermined time after the overload relay 13 closes its contacts 15, the time relay 20 closes its contacts 22 and completes an energizing circuit for the relay 21 which is arranged to open its contacts 23 immediately after its winding is energized. The opening of the contacts 23 interrupts the circuits of the holding winding 16 and the relays 17 and 20 so that these devices are restored to their normal positions without effecting the opening of the associated circuit breaker 5. The return of relay 20 to its normal position causes the relay 21 to reclose its contacts 23 so that the control apparatus is again in condition to effect the opening of the circuit breaker 1 and the associated circuit breaker 5 upon the occurrence of another fault on the load circuit.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a bus, a supply circuit, a circuit breaker connecting said supply circuit to said bus, means for opening said circuit breaker, a load circuit, a second circuit breaker connecting said load circuit to said bus, and means controlled by said first mentioned circuit breaker and a predetermined abnormal condition of said load circuit for effecting the opening of said second circuit breaker in response to said predetermined abnormal condition of said load circuit only if said first mentioned circuit breaker is open within a predetermined time after the occurrence of said abnormal condition.

2. In combination, a bus, a supply circuit, a circuit breaker connecting said supply circuit to said bus, means for opening said circuit breaker, a load circuit, a second circuit breaker connecting said load circuit to said bus, means controlled by said first mentioned circuit breaker and a predetermined abnormal condition of said load circuit for effecting the opening of said second circuit breaker in response to said predetermined abnormal condition of said load circuit only if said first mentioned circuit breaker is open within a predetermined time after the occurrence of said abnormal condition, and means responsive to the opening of said second circuit breaker for effecting the reclosing of said first mentioned circuit breaker.

3. In combination, a bus, a supply circuit, a circuit breaker connecting said supply circuit to said bus, means for opening said circuit breaker, a load circuit, a second circuit breaker connecting said load circuit to said bus, means controlled by said first mentioned circuit breaker and a predetermined abnormal condition of said load circuit for effecting the opening of said second circuit breaker in response to said predetermined abnormal condition of said load circuit only if said first mentioned circuit breaker is open within a predetermined time after the occurrence of said abnormal condition, means responsive to the opening of said second circuit breaker for effecting the reclosing of said first mentioned circuit breaker, and means for limiting the number of reclosures of said second mentioned circuit breaker.

4. In combination, a bus, a supply circuit, a circuit breaker connecting said supply circuit to said bus, means for opening said circuit breaker, a load circuit, a second circuit breaker connecting said load circuit to said bus, an overload relay responsive to the current in said load circuit, contacts controlled by said relay so that they are closed when the current in said load circuit exceeds a predetermined value, means for maintaining said contacts in their closed position and means controlled by said contacts and said first mentioned circuit breaker for effecting the opening of said second circuit breaker when said contacts are closed and said first mentioned circuit breaker is open.

5. In combination, a bus, a supply circuit, a circuit breaker connecting said supply circuit to said bus, means for opening said circuit breaker, a load circuit, a second circuit breaker connecting said load circuit to said bus, an overload relay responsive to the current in said load circuit, contacts controlled by said relay so that they are closed when the current in said load circuit exceeds a predetermined value, means for maintaining said contacts in their closed position, means controlled by said contacts and said first mentioned circuit breaker for effecting the opening of said second circuit breaker when said contacts are closed and said first mentioned circuit breaker is open, and timing means controlled by said contacts for effecting the opening of said contacts if said first mentioned circuit breaker is not opened within a predetermined time after the closing of said contacts.

6. In combination, a bus, a supply circuit, a circuit breaker connecting said supply circuit to said bus, means for opening said circuit breaker, a load circuit, a second circuit breaker connecting said load circuit to said bus, an overload relay responsive to the current in said load circuit, contacts controlled by said relay so that they are closed when the current in said load circuit exceeds a predetermined value, means for maintaining said contacts in their closed position, and means controlled by said contacts and said first mentioned circuit breaker for effecting the opening of said second circuit breaker when said contacts are closed and said first mentioned circuit breaker is open and for effecting the reclosure of said first mentioned circuit breaker after said second circuit breaker opens.

7. In combination, a supply circuit, a circuit breaker in said supply circuit, means for opening said circuit breaker, a load circuit, a second circuit breaker in said load circuit, an overload relay responsive to the current in said load circuit, an auxiliary relay controlled by said overload relay so that it is energized when the current in said load circuit exceeds a predetermined value, contacts controlled by said auxiliary relay so that they are closed when said auxiliary relay is energized, means for delaying the opening of said contacts when said auxiliary relay is deenergized, means controlled by said second circuit breaker for effecting the deenergization of said auxiliary relay when said second circuit breaker opens a trip circuit for said second circuit breaker controlled by said first mentioned circuit breaker and said contacts so that said second circuit breaker is opened when said first circuit breaker is open and said contacts are closed, and a closing circuit for said first mentioned circuit breaker controlled by said contacts and said second circuit breaker so that said second circuit breaker is closed when said second circuit breaker is open and said contacts are closed.

8. In combination, a bus, a supply circuit, a circuit breaker connecting said supply circuit to said bus, means for opening said circuit breaker, a load circuit, a second circuit breaker connecting said load circuit to said bus, a relay responsive to a predetermined abnormal condition of said load circuit, contacts controlled by said relay so that they are closed when said predetermined abnormal condition occurs, means for maintaining said contacts in their closed position and means controlled by said contacts and said first mentioned circuit breaker for effecting the opening of said second circuit breaker when said contacts are closed and said first mentioned circuit breaker is open.

9. In combination, a bus, a supply circuit, a circuit breaker connecting said supply circuit to said bus, means for opening said circuit breaker, a load circuit, a second circuit breaker connecting said load circuit to said bus, a relay responsive to a predetermined abnormal condition of said load circuit, contacts controlled by said relay so that they are closed when said predetermined abnormal condition occurs, means for maintaining said contacts in their closed position and means controlled by said contacts and said first mentioned circuit breaker for effecting the opening of said second circuit breaker when said contacts are closed and said first mentioned circuit breaker is open and for effecting the reclosing of said first mentioned circuit breaker after said second circuit breaker opens.

In witness whereof I have hereunto set my hand.

ARVID E. ANDERSON.